United States Patent [19]

Koszalka

[11] Patent Number: 5,041,211
[45] Date of Patent: Aug. 20, 1991

[54] METHOD AND APPARATUS FOR SEPARATING TRANSFORMER CORE CONDUCTIVE METAL FROM INSULATING PAPER

[75] Inventor: Duane P. Koszalka, Kansas City, Mo.

[73] Assignee: Trinity Chemical Company, Inc., Kansas, Mo.

[21] Appl. No.: 413,250

[22] Filed: Sep. 27, 1989

[51] Int. Cl.⁵ .......................... B03D 1/02; B03B 1/02; B03B 5/28
[52] U.S. Cl. .................................... 209/164; 209/166; 209/3; 209/10; 209/11; 209/173; 241/24; 134/28; 134/29,30; 210/729; 210/909
[58] Field of Search .................. 209/3, 10, 11, 164, 209/166, 173; 134/28, 29, 30; 241/19, 20, 24, 79, 79.1; 210/729, 909; 162/4, 7, 8

[56] References Cited

U.S. PATENT DOCUMENTS

| | | | |
|---|---|---|---|
| 1,726,623 | 9/1929 | Hollnagel | 134/29 |
| 3,670,969 | 6/1972 | Terada . | |
| 3,749,322 | 7/1973 | Reynolds . | |
| 4,022,638 | 5/1977 | Weet | 209/10 |
| 4,189,329 | 2/1980 | Marshall et al. . | |
| 4,194,926 | 3/1980 | Barnsbee | 134/29 |
| 4,281,444 | 8/1981 | Smith . | |
| 4,362,276 | 12/1982 | Morey | 241/79.1 |
| 4,363,449 | 12/1982 | Carr | 241/23 |
| 4,809,854 | 3/1989 | Tomaszek | 209/173 |

Primary Examiner—Stanley S. Silverman
Assistant Examiner—Thomas G. Lithgow
Attorney, Agent, or Firm—Litman, McMahon & Brown

[57] ABSTRACT

A method and apparatus for salvaging conductive material from electrical power transformers. In the method, the transformer core is removed from the transformer casing and cut so as to separate laminations from windings. The windings with conductive materials and insulative paper are cut into relatively short segments. These segments are then subjected to an aqueous caustic solution with sparging for separating the conductive material from paper insulation and lacquer coatings thereon. The solution is treated with a coagulating or flocculating agent in a separate vessel to remove dissolved cellulose, processed to separate oil and PCBs therefrom and then returned to treat additional windings. The method is adapted to continuous processing.

10 Claims, 2 Drawing Sheets

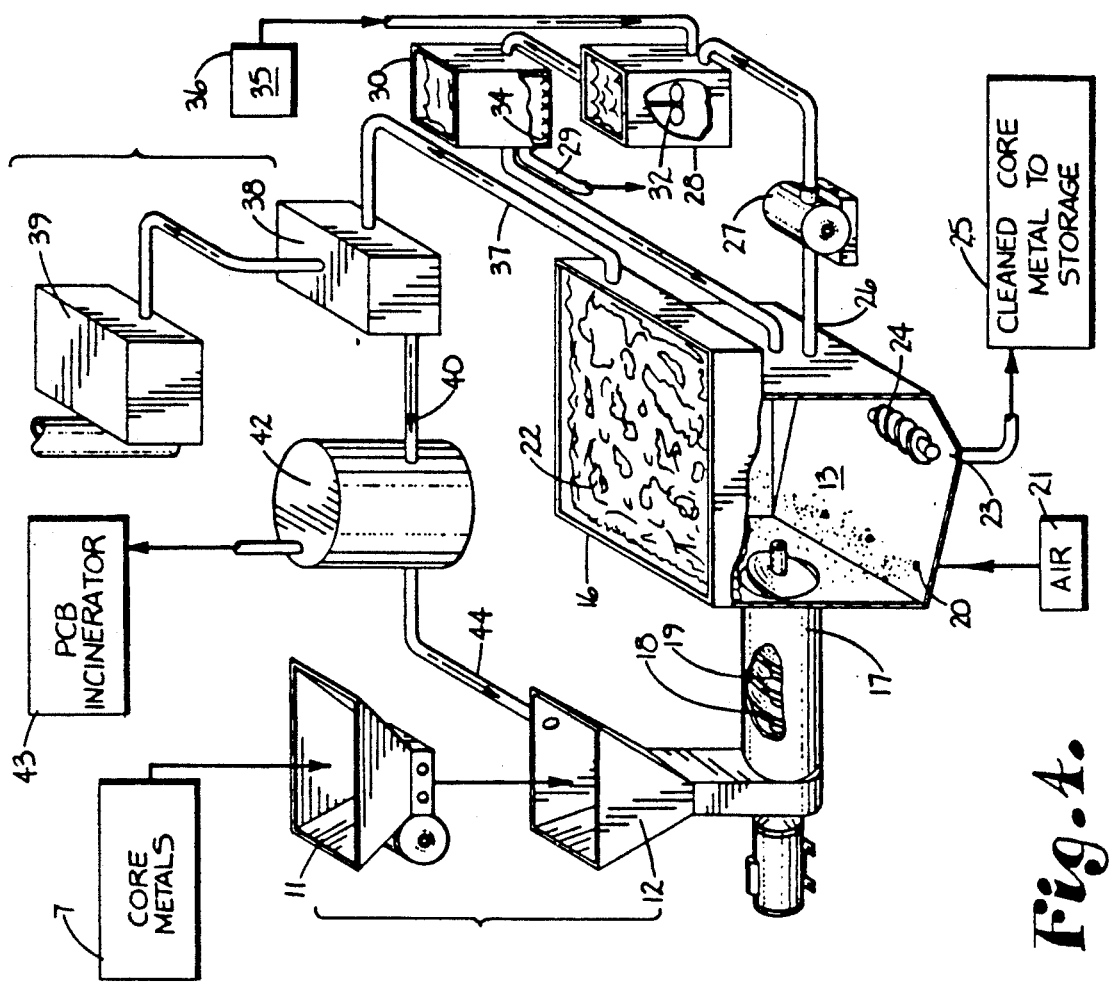
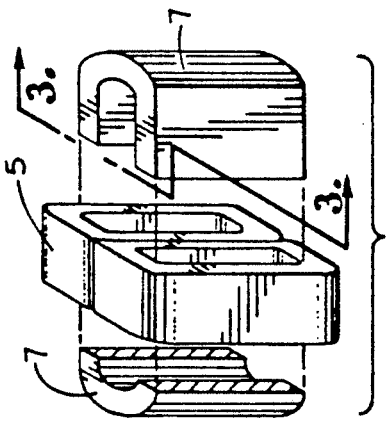
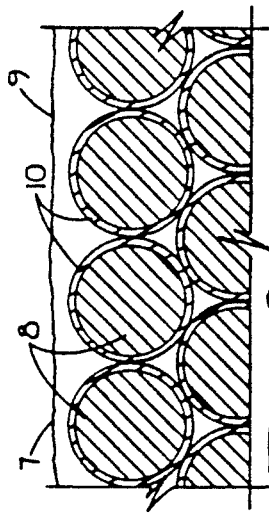
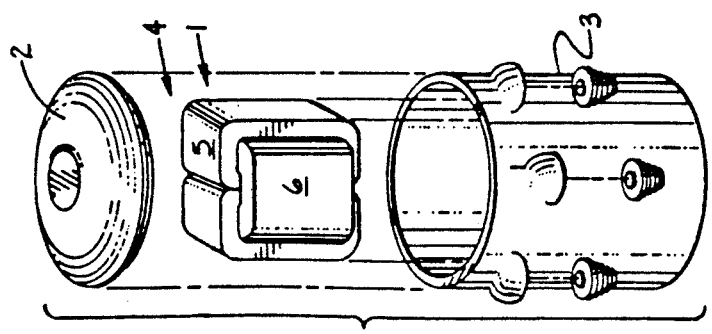

METHOD AND APPARATUS FOR SEPARATING TRANSFORMER CORE CONDUCTIVE METAL FROM INSULATING PAPER

FIELD OF THE INVENTION

The present invention relates to a method and apparatus for the recovery of valuable conductive metal from transformers containing hazardous chemicals, especially polychlorinated biphenyls (PCBs), including a method of separating insulation paper from the conductive metal.

BACKGROUND OF THE INVENTION

The continual retirement of existing electrical power transformers poses a substantial disposal problem because of toxic materials contained therein, especially PCBs. Because of the presence of the toxic materials, the recycling of otherwise useful materials (especially copper and other conductive metal) contained therein is discouraged due to health, environmental and safety reasons.

Conventional methods of salvaging conductive material from electrical power transformers are generally very labor-intensive, expensive, and relatively unsafe. Presently, most reclaiming operations use either wire stripping or thermal-wire reclaimers to salvage the valuable conductive materials from the cores of discarded transformers. A wire stripping process, besides being labor-intensive, is very slow and is generally conducted in an environment with an elevated temperature and hazardous environmental atmosphere, which requires a worker to wear a tyvek suit, a respirator and other protective gear. In addition, reclamation by stripping usually results in low recovery efficiency. Also, as the process is boring, workers frequently lose concentration leading to accidents and injury.

A thermal-wire reclamation process utilizes temperatures which are sufficient to pyrolyse or "vaporize" the paper insulation from the surfaces of the conducting material. Unfortunately, the temperatures used for thermal reclamation are generally sufficient to cause deterioration in the quality of the metallic material. More importantly, the residual ash which remains after such paper pyrolysis can contain measurable quantities of hazardous chemicals, including PCDDs and PCDFs. When such ash is subsequently dislodged, a worker is potentially exposed to dioxins and dibenzo furans. In addition, stack effluent from furnaces associated with the thermal reclamation contains such undesirable compounds that are consequently spread throughout the surrounding environment. In addition, thermal reclamation processes generally produce a substantial environmental odor that can create a public nuisance.

SUMMARY OF THE INVENTION

The present invention is directed to a simple method and apparatus to chemically remove insulating paper from conductive materials found in the windings of electrical power transformers. The windings, after removal from the transformers, are separated from laminations and are shredded into relatively short length and then conveyed into a separation tank.

An aqueous solution in the separation tank that is relatively non-hazardous and non-flammable, strips the insulating paper away from the shredded conductive material. The solution preferably expands the paper causing the paper to peel or separate from the wiring. When the wiring is copper, the solution preferably includes approximately 2% to 4% metallic hydroxide (especially sodium or calcium hydroxide) and a surfactant. The surfactant reduces the time required to "wet" the paper and separate the paper from the wire. Normally, the paper separates in about five minutes.

After the paper separates, the lesser specific gravity of the stripped paper causes it to float to the surface of the separation tank where it is removed for disposal in an incinerator. Sparged air may be bubbled into the separation tank below the paper to aid in the separation process. Because of the inherently greater specific gravity of conductive metallic material relative to the specific gravity of the aquaeous solution, the former settles to the bottom of the aqueous solution in the separation tank where it can be augered away.

The separation tank solution is heated in the range from 120° F. to 212° F. (preferably greater than 170° F.) so as to accelerate the separation of the insulating paper from the conductive material with the result of reducing processing time and labor costs. The heating also aids in dissolving plasticizers in lacquers on the surfaces of the conductive material.

Air compression equipment is provided to produce compressed air for sparging into the separation tank to create turbulence in the aqueous solution such that large pieces of the paper insulating material and most of the lacquer residue associated therewith is buoyed to the surface of the aqueous solution as a froth where it is skimmed from the tank by automatic or manual operation.

The processes of loading of winding segments into the separation tank and the removal of skimmed paper and conductive metal are preformed on a generally continuous basis. A certain amount of small cellulose fibers separate from the insulating paper and become entrained in the solution. Such cellulose would quickly overburden the solution and eventually make the solution unusable. Consequently, a portion of the aqueous solution is continuously diverted to a separate flocculation tank. In the flocculation tank, a polyelectrolyte (such as gum arabic, polyethyleneimine, or the like) is added to the solution. The cellulose fibers are coagulated by the polyelectrolyte into a quickly settling flocculant. After the cellulose flocculant settles out of the solution in a subsequent settling tank, the remaining aqueous solution is returned with makeup water and caustic, as required to maintain a desired level, to the separation tank for further processing.

OBJECTS OF THE INVENTION

Therefore, the objects of the present invention are: to provide an improved method for salvaging conductive material from insulated wires and cables obtained from discarded electrical power transformers; to provide a method for chemically separating the conductive material from the insulation paper of the said wires and cables; to provide such a method whereby lacquer and other contaminants can be simultaneously removed from the surfaces of the said conductive material; to provide such a method and apparatus that are relatively low in cost, not labor-intensive, simple and economical to operate, conducive to continuous operation, relatively safe to operate in a work environment, provide efficient salvaging of the conductive material, are not prone to atmospheric contamination and are particularly well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective exploded view of an electrical power transformer revealing an inner core with windings.

FIG. 2 is an enlarged perspective exploded view of the transformer inner core with windings that have been sectioned.

FIG. 3 is an enlarged and fragmentary cross-sectional view of the core windings, taken along line 3—3 of FIG. 2.

FIG. 4 is a perspective and partially schematic view of an apparatus utilized to separate core metal from insulative paper in accordance with the process steps of the present invention.

DETAILED DESCRIPTION OF THE INVENTION

Figure 5:
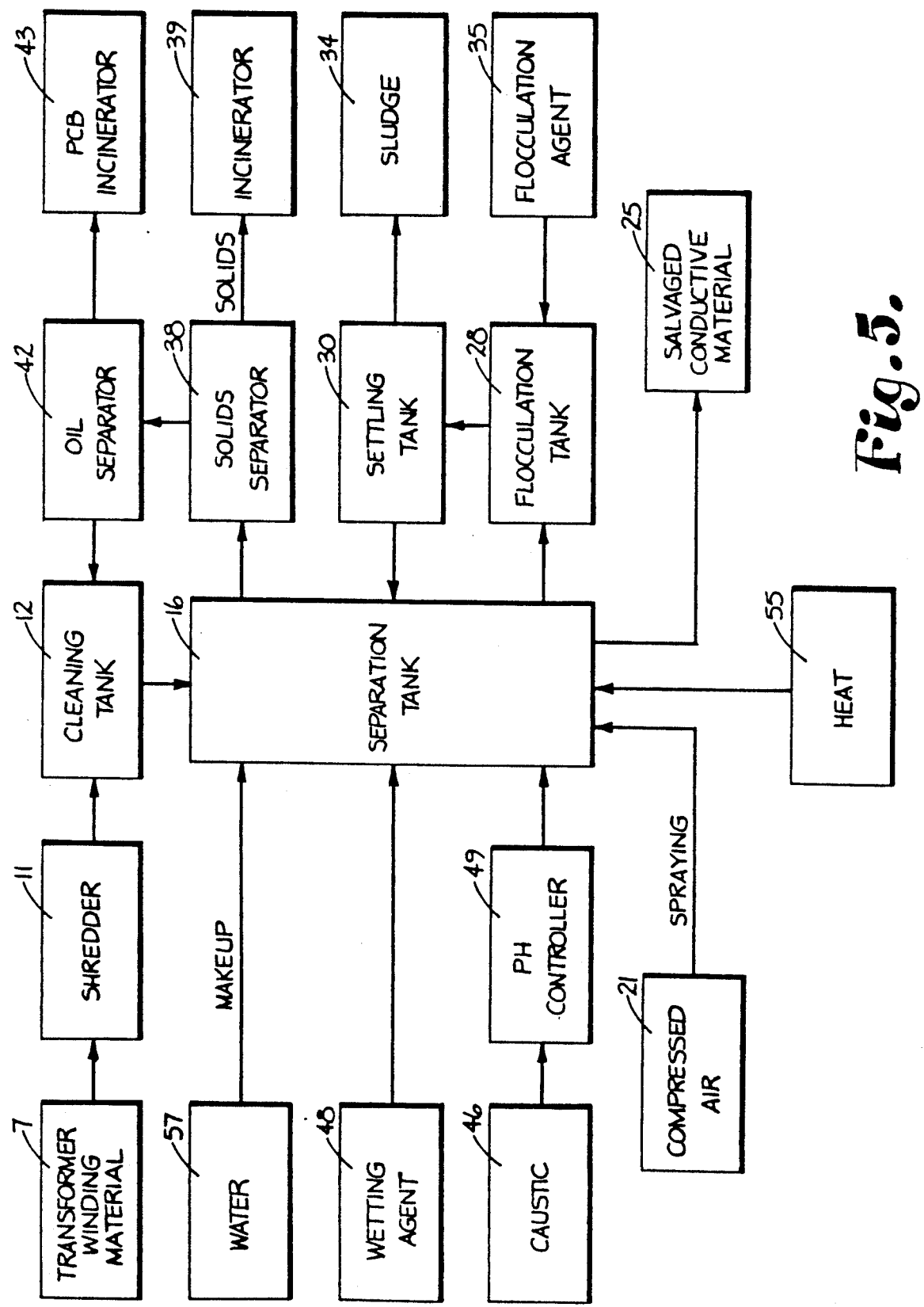
FIG. 5 is a schematic block diagram of the process for separating transformer core metal from insulating paper.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is directed to a process for salvaging metal from an electrical power transformer, generally designated by the reference numeral 1, that is contaminated by PCBs or the like. As seen in FIG. 1, a lid 2 is removed from a tank 3 of the transformer 1 from which oil has been previously drained and a core 4 of the transformer 1 is removed from the transformer tank 3. The core 4 is initially cleaned using conventional methods (not shown) of draining, flushing and vapor-degreasing to remove surface oils, PCBs and the like. The core 4 includes central metal (normally iron) laminations 5 and conductor windings 6 that are wound about central openings of the laminations 5. The windings 6 are cut away in sections 7 from the laminations 5 using a band saw or other cutting instrument, as is illustrated in FIG. 2.

The windings 5 include conductive material in the form of long continuous wire or wire-like metal conductors 8 (normally copper but also sometimes aluminum or other conductors) which are coated with a paper material 9 for electrical insulating purposes, as is shown in cross-section in FIG. 3. The insulating paper 9 is normally coated with a layer of lacquer 10. In order to salvage and recycle the conductive material, it is necessary to effectively and efficiently remove the lacquer 10 and the insulating paper 9 from the conductive material 8 along with any contaminants that have soaked into insulating paper 9 and lacquer 10, especially PCBs.

After separation of the sections of windings 7 from the laminations 5, the windings are placed in a shredder 11 or other readily available equipment which is capable of shredding, commutating or the like, the windings 7 into smaller segments on the order of one-fourth to three inches in length including the conductor 8, paper 9 and lacquer 10. The purpose for such shredding is to expose more surface area such that the insulating paper 9 and the lacquer coatings 10 are more susceptible to subsequent processing as hereafter described and so that the winding material is less cumbersome.

Subsequently, the insulating paper 9 is physically separated from the conductive core material 8 of the windings 7. Following the shredding procedure, a large cleaning tank or hopper 12, containing an aqueous solution 13 therein, is utilized for preliminary cleaning and removal of the insulating paper 9 from the conductive material 8.

Interconnecting the lower end of the hopper 12 with a separation tank 16 is a cylindrical duct 17. An auger 18, having an outside diameter dimensioned slightly less than the inside diameter of duct 17, extends into the bottom of the hopper 12, as well as completely through and co-axial with respect to the duct 17, and terminates inside the separation tank 16. The auger 18 is power driven by its own motor such that the insulating paper 9, conductive material 8 and aqueous solution 13 can be turbulently transported as a slurry 19 from the hopper 12 to the separation tank 16 such that the aqueous solution 13 permeates between the insulating paper 9 and the conductive material 8, thereby contributing to some coarse separation of the insulating paper 9 from the conductive material 8 in the duct 17.

Across the bottom of the separation tank 16, a plurality of perforations 20 are provided whereby compressed air 21 sparged into the aqueous solution 13 in the tank 16. During the sparging process, the paper insulation 9 and the other light solids are swept to the surface of the aqueous solution 13 in the separation tank 16 as a froth 22 and the conductive material 8 settles to the bottom of the separation tank 16. A sloped surface 23 in the bottom of the separation tank 16 urges the conductive material 8 toward an auger 24 that, in turn, urges the separated conductive material 25 from the separation tank 16 where it is ready for further processing or baling for shipment to a smelter.

A pipe 26 flow communicates through one side of the separation tank 16 with the solution 13 therein. A portion of the aqueous solution 13 is pumped by a pump 27 through a flocculation tank 28, a settling tank 30, and then returned to a remainder of the solution 13 in the separation tank 16. A flocculation agent 35 from a reservoir 36 is selectively metered into the flocculation tank 28. A stirrer 32 is provided within the flocculation tank 28 to mix the flocculation agent 35 with the aqueous solution 13 extracted from the separation tank 16 and to retain any coagulants in suspension until routed to the settling tank 30. A drain 29 is provided whereby precipitant 34 collected in the bottom tank 30 can be removed from the bottom of the settling tank 30 for disposal or further processing.

Piping means such as the illustrated pipe 37 is provided such that the froth 22 containing paper 9 and the like can be skimmed, dipped or otherwise removed from the surface of the aqueous solution 13 in the separation tank 16 and directed into a solids separator 38, such that the insulating paper 9 and other light solids contained in the froth 22 are separated from a liquid portion thereof. The insulating paper 9 and other light solids separated from the froth 22 are then further dried by auger or filter presses or the like at the separator 38, and thereafter directed into an incinerator 39 for disposal. It is foreseen that the paper 9 may also be disposed of in a landfill approved for such material or, especially where PCB content of the oil in the transformer 1 is above 500 parts per million in a PCB approved incinerator. The liquid portion exiting the separator 38 is then routed by conduit 40 through an aqueous phase - oil phase separator 42 to substantially remove any residual PCBs and other oil-like contaminants contained therein by settling. An incinerator 43 suitable for burning PCBs or other acceptable disposal apparatus is used to appropriately dispose of PCBs and other undesirable contaminants separated from the aqueous solution 13 and the remaining solution 13 is directed back into the hopper 12 for further processing through a pipe 44.

In operation of the present invention, after transporting the slurry 19 including the aqueous solution 13 and the ground up windings 7 into the separation tank 16, the insulating paper 9, not already separated from the conductive material 8, is separated from the conductive material 8 through an oxidative hydrolysis reaction process. In the separation tank 16, mild caustic, such as 2% to 4% by weight sodium hydroxide or the like, and a wetting agent 48, such as 0.1% by weight trisodium phosphate, a sulfate or the like, combine to attack the fibers of the insulating paper 9.

For example, where the conductive material 7 is copper, the preferred aqueous solution 13 includes about 4% by weight sodium hydroxide with sodium hydroxide being continuously added from caustic storage 46 to the solution 13 as necessary to maintain the desired concentration. For other metals such as aluminum, a weaker caustic solution with longer residence time may be utilized to limit etching or dissolving of the metal by the caustic.

The introduction of the wetting agent 48 promotes the reaction since the wetting agent 48 allows more rapid penetration of the oil-soaked paper 9 by the caustic solution. Recycling efficiency is enhanced by using a wetting agent 48 which is not an organic molecule, which helps reduce the organic loading of the aqueous solution 13.

Normal residence time of the conductive material 7 in the aqueous solution 13 is about two to five minutes where the windings are copper and where the solution 13 includes about 4% sodium hydroxide and is preferably heated to approximately between 170° F. and 212° F.

It is theorized that the cellulose fibers in the insulating paper 9 swell due to the absorption of the aqueous solution 13 in the separation tank 16. As the swelling progresses, interfiber bonds in the insulating paper 9 are stretched. The caustic 46 initiates cleavage of these bonds and the paper 9 begins to float loose into the aqueous solution 13 of the separation tank 16. The freed bonds may contain acidic sulfur, which binds with oxygen atoms in the water or in entrained air bubbles to satisfy its requirement for charge stabilization and electrons. As a result, sulfuric acid is produced. The caustic 46 provides sodium ions which neutralize the sulfuric acid thereby providing additional oxygen atoms for the oxidation process.

Additional swelling occurs as the bonds continue breaking and more fibers swell. As the paper 9 literally expands along its width and length, the dimensions of the conductive material 8 remain relatively constant, and the paper insulation 9 simply peels away from the conductor 8. As the reaction progresses, caustic 46 is consumed. The concentration of the caustic 46 in the separation tank 16 is automatically maintained by conventional pH control systems or the like and controlled within an allowable pH range with a controller 49. A unique characteristic of the present invention is that the aqueous solution utilized contains no highly toxic, hazardous or flammable chemical solvents.

In addition to the oxidative hydrolysis of cellulose fibers in the insulating paper 9, another reaction taking place in the separation tank 16 is the destabilization of the lacquer coatings 10 by destruction of the coating plasticizers or phenolics where used therein due to the interactions thereof with the caustic 46 and oxygen.

To increase the paper separation rate, heat is applied to the aqueous solution 13 in the separation tank 16. In the environment of the aqueous solution 13 of the separation tank 16, the lacquer coatings 10 become very brittle. The additional heat facilitates the dissolving of the lacquer coating 10 into the solution 13. When the separation tank 16 is sparged with compressed air 21, the insulating paper 9 which has separated from the conductive material 8 and most of the lacquer coating 10 float to the surface of the aqueous solution 13 in the separation tank 16 where it can be easily skimmed away.

After separating out the paper 9 and other floating solids, which are substantially dried in the separator 38 and disposed of in the incinerator 39 which may be a PCB approved incinerator for use in conjunction with transformers having relatively higher PCB concentrations in the oil thereof, the liquid residue is then diverted through the liquid interface separator 42 to remove PCBs which are disposed of in an incinerator 43 constricted to safely burn PCBs. After removing residual PCBs, the remaining liquid is then directed back into the separation tank 16.

The conductive material 8, which has settled to the bottom of the separation tank 16 because of its greater specific gravity, is then augered along the bottom of the separation tank 16 and disposed of through the discharge 23.

During continuous processing, the aqueous solution 13 in the separation tank 16 eventually becomes overburdened with cellulose fibers such that further processing is inhibited. To prevent this overburdening, the excess cellulose fibers must be removed from the aqueous solution 13 in the separation tank 16. The cellulose fibers contained in the separation tank 16 are ideally suited to coagulation with a polyelectrolyte since the long filamentous, cellulose fibers provide large surfaces for bonding with the charged polymer of a polyelectrolyte. As a result, the cellulose fibers can be coagulated as a quickly settling flocculant.

To accomplish removal of cellulose fibers from the aqueous solution 13 in the separation tank 16 and thereby control the concentration thereof, aqueous solution 13 laden with cellulose is pumped out of the separation tank 16 and into the flocculation tank 28. A flocculation agent or polyelectrolyte 31 is added to the solution in the flocculation tank 28 and gently mixed with the stirrer 32. The mixed solution is then directed into the settling tank 30 where the cellulose flocculant settles out of the solution as the sludge 34. After settling, the aqueous solution 13 is then returned to the separation tank 16. The cellulose flocculant sludge 34 that settles to the bottom of the settling tank 30 is removed through drain 29 and appropriately later processed or disposed of as waste. With the return of the aqueous solution to the separation tank 16, additional water 57 and caustic 46 must be added to the separation tank 16 to readjust for solution and ingredients thereof which were lost due to paper absorption, sludge removal and evaporation.

As a specific example of an application of the present invention that is not intended to limit the scope of the invention, a solution of 4% (by weight) sodium hydroxide, 0.1% (by weight) trisodium phosphate and water was used to successfully separate insulating paper from copper. The solution was heated to a temperature of approximately 200° F. and the separation of the copper conductor from the paper took in less than five minutes. Substantially all paper, lacquer and other contaminants such as PCBs were removed from the resulting cleansed core metal by the process.

It is foreseen that mechanical agitation may also be utilized to help separate the paper 9 from the windings 7.

It is to be understood that while certain forms of the present invention have been illustrated and described herein, it is not to be limited to the specific forms or arrangement of parts described and shown.

What is claimed is:

1. A method for removing insulating paper from a conductive wire in a transformer winding, comprising the steps of:
   (a) shredding said winding into a plurality of small segments;
   (b) submerging said segments into a caustic aqueous solution of strength sufficient to cause separation between said paper and said wire; and
   (c) thereafter allowing sufficient residence time to allow said paper to be removed from said wire by flotation of said paper from said wire.

2. The process according to claim 1 including the step of:
   (a) sparging air into said solution to urge said paper to the surface of said solution.

3. The process according to claim 1 wherein:
   (a) said aqueous solution contains a metallic hydroxide and a wetting agent.

4. The process according to claim 3 including the step of:
   (a) heating the aqueous solution to a temperature such that plasticizers in a lacquer coating on the said segments are dissolved.

5. The process according to claim 1 including the step of:
   (a) heating said solution within a range from about 120° F. to 212° F.

6. The process according to claim 1 including the steps of:
   (a) separating a first portion of the aqueous solution including cellulose fibers therein from a remaining portion;
   (b) coagulating said cellulose fibers with a flocculating agent in said first portion; and
   (c) returning said first portion with said fibers substantially removed to said remaining portion.

7. The process according to claim 1 wherein:
   (a) the process is conducted as a continuous operation.

8. A method for continuously separating insulating paper from conductive metal of transformer windings, comprising:
   (a) shredding said windings into a plurality of small segments;
   (b) submerging said segments into an aqueous solution containing a mild caustic and a wetting agent of sufficient strength to cause separation between said paper and said metal;
   (c) thereafter separating said paper from said metal by allowing said metal to collect at the bottom of said solution and said paper floating in said solution away from said metal;
   (d) removing said metal without said paper from said solution; and
   (e) removing contaminants from said solution with a flocculating agent.

9. The method according to claim 8 wherein:
   (a) said metal is copper;
   (b) said solution contains about 2% to 4% by weight sodium hydroxide; and
   (c) said flocculating agent is a polyelectrolyte.

10. A method for continuously separating insulating paper from conductive metal of transformer windings, comprising:
    (a) shredding said windings into a plurality of small segments;
    (b) forming a slurry of said segments;
    (c) transporting said segments into a tank containing an aqueous solution comprising about 2% to 4% by weight sodium hydroxide as a mild caustic and about 0.1% by weight trisodium phosphate as a wetting agent;
    (d) heating said aqueous solution to between about 120° F. and 212° F. to dissolve plasticizers in lacquer coating contained in said segments;
    (e) sparging of air into said aqueous solution to sweep said paper and other light solids to the surface of said aqueous solution as a froth;
    (f) extracting a first portion of said aqueous solution from a remaining portion of said solution such that cellulose contaminants therein can be removed; adding a polyelectrolyte as a precipitant to said first portion thereby forming a coagulant of said paper; removing said coagulant from said first portion; separating and removing an oil layer containing PCBs from said first portion; and thereafter returning said first portion to said remaining portion;
    (g) skimming said froth from the surface of said tank; drying and burning non-aqueous components of said froth; and
    (h) allowing said conductive metal to settle to the bottom of said tank; and removal of said metal from said tank with said paper removed therefrom.

* * * * *